July 7, 1970 R. E. TALMO ET AL 3,518,886
ANALOG CONVERTER
Filed April 13, 1967 3 Sheets-Sheet 1
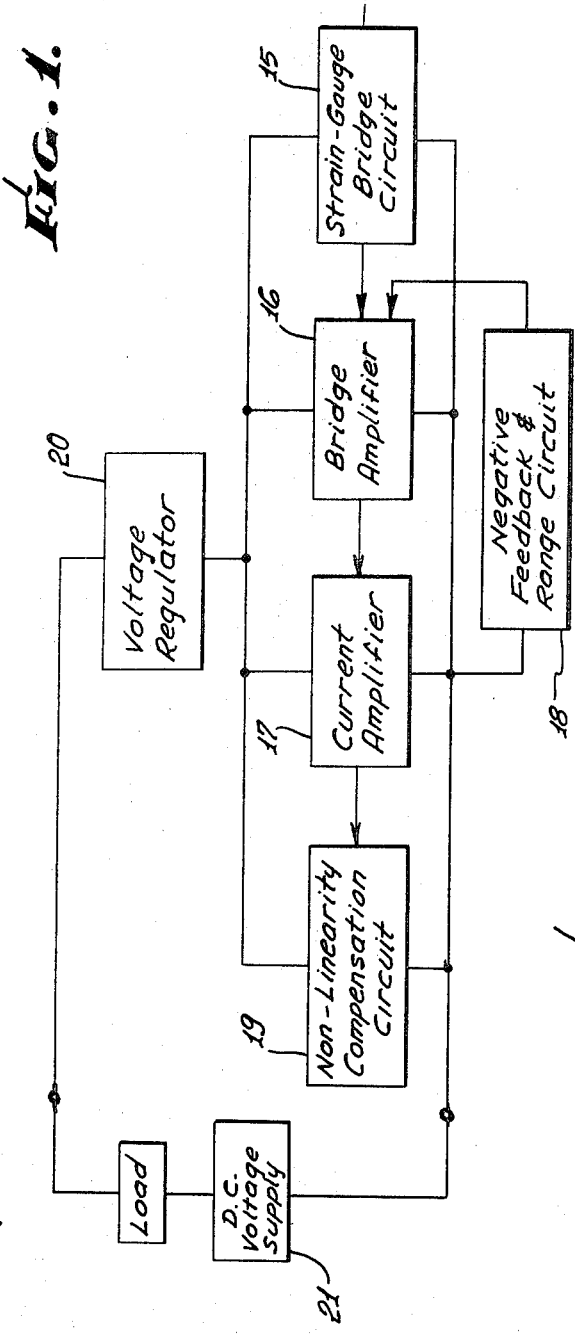
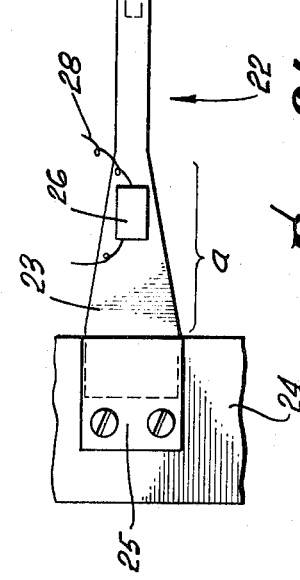
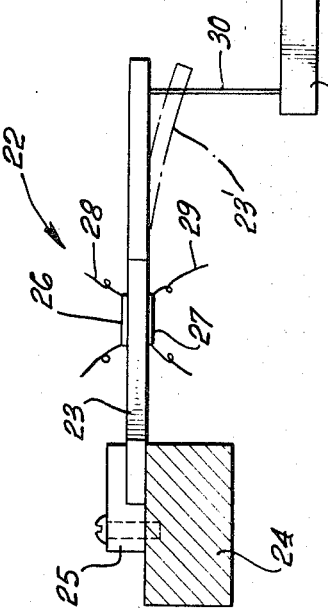
INVENTORS.
ROBERT E. TALMO
THOMAS H. LEE
By George J. Netter
ATTORNEY.

INVENTORS.
ROBERT E. TALMO
THOMAS H. LEE
BY George J. Netter
ATTORNEY.

United States Patent Office 3,518,886
Patented July 7, 1970

3,518,886
ANALOG CONVERTER
Robert E. Talmo, Pasadena, and Thomas H. Lee, Los Angeles, Calif., assignors to International Telephone and Telegraph Corporation, New York, N.Y., a corporation of Delaware
Filed Apr. 13, 1967, Ser. No. 630,574
Int. Cl. G01l 9/04
U.S. Cl. 73—407    2 Claims

ABSTRACT OF THE DISCLOSURE

The mechanical displacement, or other movement, to be converted to an electric signal analog is directly linked to a special beam for deflecting it an amount corresponding to the displacement. Strain gauges mounted on the beam are arranged in a bridge circuit. Deflection of the beam places the gauges in strain thereby unbalancing the bridge circuit to provide an imbalance signal. Additional circuit apparatus converts the bridge signals to a D.C. current signal, and further provides compensation for non-linearity of the mechanical displacement system.

---

The present invention relates generally to an analog converter, and more particularly, to apparatus for converting a mechanical movement, having a functional relationship to some physical parameter being monitored, to a corresponding electric signal analog.

BACKGROUND OF THE INVENTION

There are innumerable applications in which it is desirable to convert a mechanical quantity, such as the rotative position of a shaft, into an equivalent electric signal either to permit further processing or to actuate collateral equipment. For example, in a typical differential fluid pressure measurement technique, separate bellows means are pressure related to respective fluids being and mechanical linkages rotate an output shaft an angular amount that is functionally related to the instantaneous difference in fluid pressures measured by the bellows means. And, it is convenient and useful to have the shaft orientation represented in electric signal form for actuating a recorder, a meter indicator, a controller, or a computer for processing. Although it is primarily in this context of differential fluid pressure measurement that the invention is described hereinbelow, it is to be understood that the invention would be equally applicable for use with static pressure, humidity, or temperature measuring devices which have an output in the form of limited shaft rotation, or other physical displacement.

PRIOR ART

One known pressure measuring scheme is the so-called "force-balance" method, in which the force being measured distends a diaphragm, and through a null-zero servo, counter force is applied to a beam to rebalance the original force. A basic force sensor involved here is a coil with a movable core and the load current is the force-motor current that is required to balance the force on the diaphragm. In such a system the force balancing motor is a relatively large and expensive item. Also in view of the relatively large mass of parts associated with the basic force sensor (bellows, for example), degraded performance can result upon subjection to environments of shock or vibration.

Another well-known technique is the so-called "motion balance" system (also frequently referred to as "pseudo-force"). In this type of system, the basic force sensor (a bellows, for example) is designed to produce a relatively large motion which is used to unbalance a preset balance condition of an electrical component, such as a coil with a movable core piece, so incorporated in a circuit as to thereby produce an error drive signal. The signal powers a motor for producing rebalance of the motion. Load current, again, is the rebalance motor current. As in the force-balance systems, the motor is a relatively large and expensive item, and shock and vibration environments may pose reliability problems or adversely affect accuracy.

It is, therefore, a primary object and purpose of this invention to provide apparatus for directly converting a rotative motion produced by fluid pressure into an analog electric signal.

Another object is the provision of an analog converter circuit means including compensation means for maintaining a linear output.

A further object is the provision of analog conversion apparatus in which a semiconductor strain gauge is used as a mechanical position sensor.

Yet another object is the provision of such analog conversion apparatus in which strain gauge position sensors are mounted on a region of a beam having constant strain characteristics.

SUMMARY OF THE INVENTION

Briefly, the above objects, features and advantages of the present invention are obtained by coupling the rotative motion of the output shaft of a differential fluid pressure transducer through a flexure wire to the free end of a cantilever beam, such that rotation of the shaft produces corresponding deflection of the beam. Strain gauges are mounted on the beam to be subjected to strain corresponding to beam deflection. Bridge circuit means, including the strain gauges as operative members in the legs thereof, provide imbalance signals representative of the degree of strain to which the strain gauges are subjected and, thus, the magnitude of the differential fluid pressure. Non-linearity compensation circuit means reinforces the bridge imbalance signals corresponding to ranges in which the pressure transducer is inherently non-linear.

Other objects and advantages of the invention will be apparent to those skilled in the art to which it pertains upon reference to the following description when considered with the accompanying drawing.

BRIEF DESCRIPTION OF THE DRAWING

FIG. 1 is a schematic, function block diagram of the analog conversion apparatus of the invention.

FIGS. 2a and 2b are schematic representations of a cantilever mounting means for strain gauges incorporated in the apparatus of FIG. 1.

DESCRIPTION OF THE PREFERRED EMBODIMENT

Figure 3:
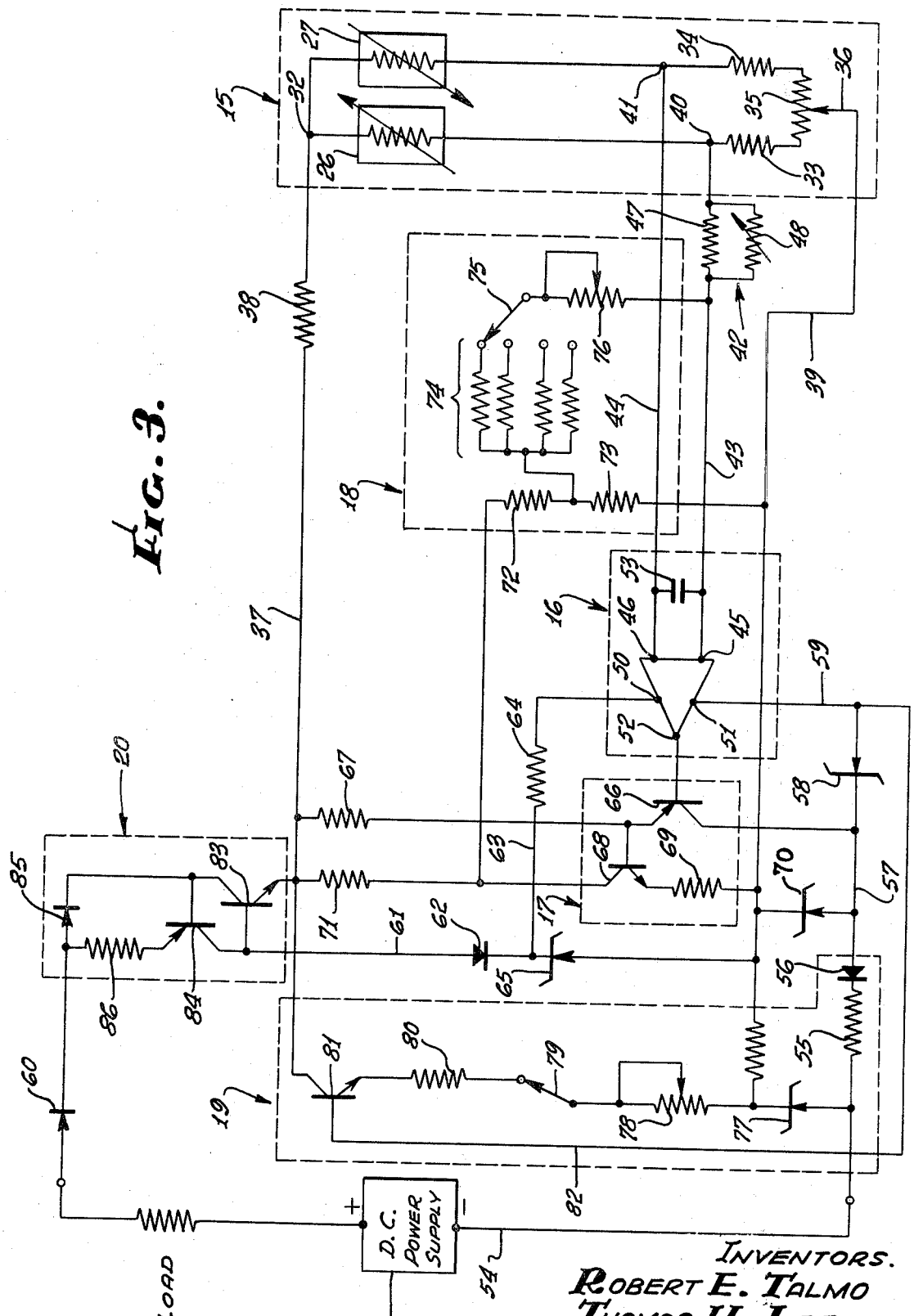
FIG. 3 is a detailed circuit schematic of the conversion apparatus of FIG. 1.

With reference now particularly to FIG. 1, there is shown schematically a differential pressure measuring unit 10 including a pair of bellows means 11 and 12 pressure related to separate supplies of pressurized fluid (not shown). By a common linkage 13 the differential pressure effect on the two bellows means produces a corresponding rotation of shaft 14. An excellent device of this character is set forth in the U.S. Pat. 2,664,749 to Barton Jones, entitled, Fluid Pressure Responsive Equipment, which issued on Jan. 5, 1954.

In a way that will be more fully described below, the rotation of the shaft 14 is coupled to a strain gauge Wheatstone bridge 15 producing an electrical imbalance proportional to the angle of rotation. Although not critical to operation of the invention, but merely exemplary of the amount of shaft rotation provided by such device, the above-identified commercially available differential pressure unit provides a 0–8 degree shaft rotation for the full range of differential pressure measurement. Signals produced as the balance of the bridge circuit is disturbed, are amplified by a bridge amplifier 16, and the amplified signal current is then increased by a current amplifier. A negative feedback circuit 18 provides system stability and rangeability. A special non-linearity compensation circuit 19 is made selectively operative to modify the output of amplifier 16 when the differential pressure unit 10 is operating in a range of fluid pressures for which it is inherently non-linear. A D.C. voltage regulator 20 fed by a suitable D.C. voltage supply 21 furnishes required electric power for the bridge circuit 15, bridge amplifier 16, current amplifier 17, and compensation circuit 19, as well as the load.

FIGS. 2a and 2b depict different views of a special beam means 22, controlled deflection of which is caused by rotation of the shaft 14 to produce a corresponding imbalance of the strain gauge bridge circuit 15. More particularly, a beam 23, generally elongate and of relatively thin cross-section, is cantilever mounted from one end to a base 24 by means 25. As shown best in FIG. 2b, the outer reaches of the beam are uniformly rectangular, while adjacent the mounting end it gradually widens out thereby providing a trapezoidal portion a immediately adjacent the base 24. It can be shown that this particular shape of the region a causes the beam to exhibit substantially constant strain throughout the region on being subjected to a given deflection.

Strain gauges 26 and 27 are suitably cemented, respectively, to opposite sides of the beam 23 and within the region a. Electrical connection is accomplished via respective leads 28 and 29. Strain gauges are well-known devices, comprising essentially an electrical resistor constructed of a material that exhibits a significant change of resistance upon being subjected to a mechanical strain. A thin layer of the semiconductor silicon has been found to function exceptionally well as a strain gauge for the present invention, in that monocrystalline silicon provides exceptionally high resistance change per unit strain (so-called "gauge factor"), within an ample range of strain and is sufficiently rugged to withstand normally encountered shocks and vibration for equipment of this type. Moreover, silicon used in this capacity has shown itself to have high fatigue life, low hysteresis, and to be generally very stable.

The end of the beam 23 is linked via a flexure wire 30 to an arm 31 affixed to the shaft 14. Rotation of the shaft in the direction of the arrow as shown in FIG. 2a produces a downward deflection of the beam (dash-line depiction 23). It is to be particularly noted that such a deflection simultaneously produces a positive strain (elongation) of the strain gauge 26 and a negative strain (shortening) of the strain gauge 27. As will be appreciated by those skilled in the art, the electrical effect resulting from the different kinds of strain is different, namely, strain gauge 26 will increase in resistance while the strain gauge 27 will experience a decrease for P-doped monocrystalline silicon. As will be made clear in the discussion of the detailed circuit, sensitivity of the system is enhanced by using this difference in electrical resistance between the two strain gauges produced by a given deflection, rather than, say, using the smaller value of resistance change of just one such strain gauge.

In locating the strain gauges on the relatively large constant strain region a considerable manufacturing simplification is achieved. If, instead, mounting had to be made on a conventional rectangular beam, the positioning of each of the strain gauges on the beam would have to be very accurately accomplished in order to prevent the two gauges from experiencing considerably different magnitudes of strain for the same deflection. Moreover, calibration is considerably simplified by having the two gauges experience the same degree of strains.

Attention is now directed to FIG. 3 and the detailed circuital aspects of the invention. The strain gauges 26 and 27 have one end in common as at 32 and their other ends connected to the ends of a series circuit of fixed resistors 33 and 34 and variable resistor 35, the latter being provided with a slidewire contact 36. These resistors and the two strain gauges comprise the bridge circuit 15, with regulated electric power being provided via line 37 through dropping resistor 38 to point 32, and from line 39 to slidewire contact 36. The electrical resistance values of the different bridge resistors and strain gauges are such that when the strain gauges are in unstrained condition zero potential drop exists between circuit points 40 and 41. When the gauges are subjected to strain, the bridge is unbalanced and a potential is produced across points 40 and 41 of value corresponding to the degree of strain imposed on the gauges. Adjustment of the slidewire contact 36 is for "zeroing" purposes.

As already indicated, through the special mounting arrangement of the strain gauges, when one gauge is strained to a higher resistance condition, the other gauge is simultaneously brought to a corresponding lower resistance state. Therefore, by placing the gauges in different "legs" of the bridge, there is a multiplied effect of each strain imposition of the shaft 14 which enhances overall system sensitivity.

Imbalance signals from the bridge circuit are fed from points 40 and 41 via a temperature compensating network 42 and leads 43 and 44 to the input terminals 45 and 46 of the amplifier 16. The temperature compensating network comprises a series resistor 47 and a negative temperature coefficient resistor 48 in shunt therewith. The bridge amplifier includes an operational amplifier 49 having bias terminals 50 and 51 and an output terminal 52. A suitable amplifier for this purpose in integrated circuit form is that identified as the $\mu$A702 made commercially available by Fairchild Semiconductor, Mountain View, Calif. In addition, a capacitor 53 is disposed in shunt with amplifier input for noise rejection purposes. Voltage to bias terminal 51 is obtained from the negative side of the power supply, line 54, resistor 55, diode 56, lead 57, Zener diode 58, and lead 59. Bias for the other terminal 50 is obtained from the power supply via the load, a polarizing diode 60, voltage regulator 20, lead 61, diode 62, lead 63 and resistor 64. The common point of diode 62 and resistor 64 is referenced to line 39 by Zener diode 65.

The voltage amplified bridge signal available at the amplifier output terminal is applied to the base of a PNP transistor 66, the emitter of which is connected through resistor 67 to line 37 and the collector is connected to lead 57. The emitter of transistor 66 is also electrically related to the base of an NPN transistor 68 which has its emitter tied through resistor 69, line 39, Zener diode 70, line 57 and thence to power supply line 54. The collector of transistor 68 is tied through resistor 71, and the regulator 20 into the current line through the load. The theory of operation of current amplifier 17 is relatively straightforward in that signals applied to the base of transistor 66, and thence to the base of transistor 68, produce high current gain by what amounts to a complementary type of emitter follower.

It is clear that the operation of the circuit described to this point produces a current through the load of a value directly dependent upon the strain condition of the gauges 26 and 27, which in turn, is proportional to the measured parameter.

The negative feedback and range circuit 18 consists of serially arranged resistors 72 and 73 interconnecting line 39 with the common point of resistor 71 and collector of transistor 68. Multiple feedback paths to the input line 43 of bridge amplifier 16 are provided from the common point of resistors 72 and 73 through range scaling resistors 74, range switch 75 and selectively adjustable trimming resistor 76. The values of the range scaling resistors 74 are such as to provide full range, or full scale, output for bridge imbalance signals that are $\frac{1}{10}$F.S. (full scale), $\frac{1}{5}$F.S., $\frac{1}{2}$F.S., and full scale. That is, by an appropriate setting of the range switch 75 output current magnitude to the load can be amplified in the ratios 1:1, 2:1, 5:1 and 10:1. Range values intermediate to those achieved by the range switch are provided through adjustment of the trimming resistor 76, which might alternatively be termed a span control.

The non-linearity compensation circuit 19 comprises a series circuit beginning with power supply line 54, and in the order stated, of a Zener diode 77, a variable resistor 78, switch 79, fixed resistor 80, emitter-collector path of an NPN transistor 81 to the line 37, and to the other side of the power supply through the load. The base of transistor 81 is connected via line 82 to line 59 for threshold switching thereof.

The resistor 55 is of such value as to prevent reinforcing current being provided until that amount of signal is obtained from the bridge which corresponds to the differential pressure unit being operated above about $\frac{1}{2}$F.S., i.e. in its non-linear range. Diode 56 provides temperature compensation.

Figure 4:
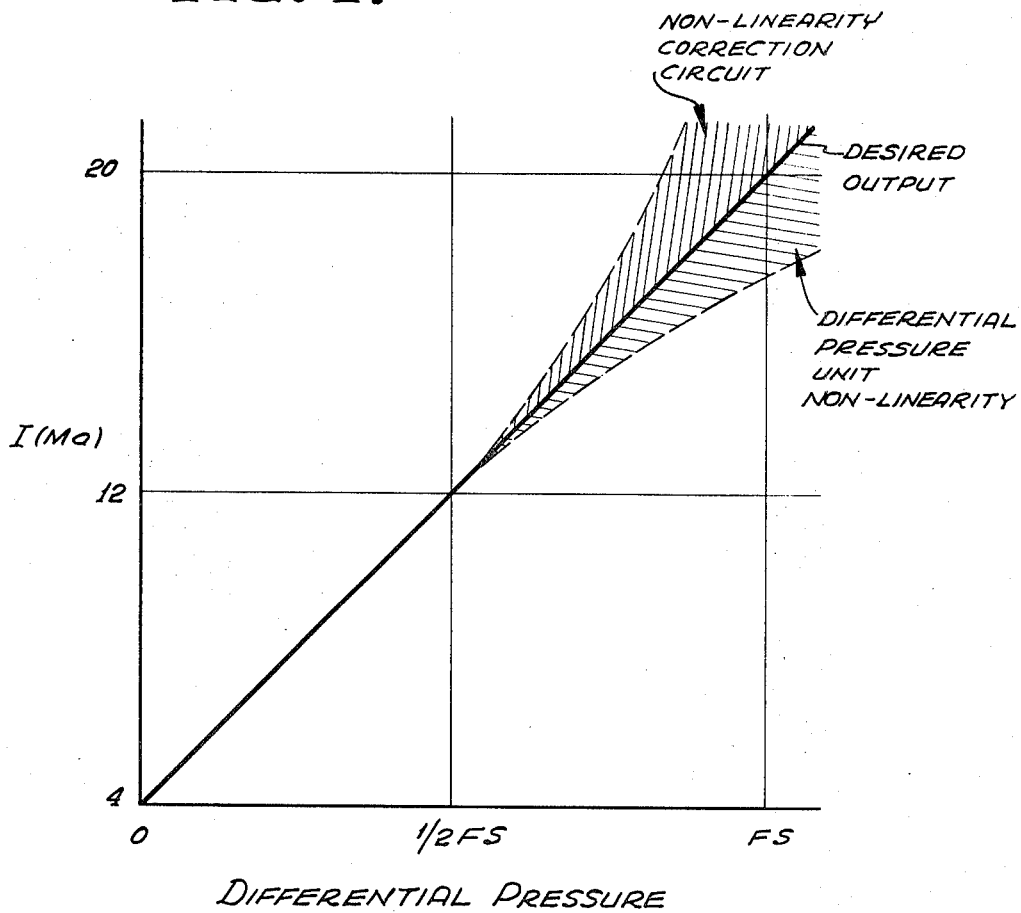
FIG. 4 is a graphical depiction of the non-linearity compensation aspect of the invention.

With switch 79 in the closed position, an additional amount of current is made available to the load thereby providing compensation or correction for the non-linear operation of the differential pressure transducer. As is shown in the graph of FIG. 4, the pressure transducer provides a substantially linear output from 0 to about $\frac{1}{2}$F.S. (full scale); however, from $\frac{1}{2}$F.S. to 1F.S. a drooping output results. For this reason, the non-linearity circuit is not operative continuously, but is placed under the selective control of switch 79, that can be made either individually actuatable, or ganged with the range switch 75.

The voltage regulator 20 includes an NPN transistor 83 having its base tied to lead 61 and the collector of a PNP transistor 84, its collector connected to the base of transistor 84, and its emitter connected to line 37. The cathode of a temperature compensating diode 85 is connected to the base of transistor 84, and its anode is connected to the cathode of polarizing diode 53. A current limiting resistor 86 interconnects the anode of diode 85 and the emitter of transistor 84. Therefore, any terminal voltage variation can be compensated for by transistors 83 and 84, such that a constant voltage is available for overall system bias.

Although in the foregoing description of a preferred embodiment of this invention the strain gauges 26 and 27 have been particularized as constructed of monocrystalline silicon, it is contemplated that other materials may be used in this connection and still come within the spirit of the invention. For example, satisfactory results can be obtained with strain gauges constructed of germanium and silicon carbide, as well as the more conventional metal types.

There is obtained in the practice of this invention a differential pressure analog conversion apparatus (or "transmitter") providing an analog direct current output that is accurately proportional to the differential pressure. Through the use of solid-state circuits and a special mounting arrangement of semiconductor strain gauges the novel conversion apparatus has high sensitivity, exceptional stability and yet is capable of operating in relatively high shock and vibration environments.

Although a preferred embodiment of the invention has been disclosed herein for purposes of illustration, it will be understood that various changes, modifications and substitutions may be incorporated in such embodiment without departing from the spirit of the invention as defined by the claims which follow.

What is claimed is:

1. Apparatus for converting mechanical movement of a member to a corresponding electric signal analog comprising: support means adapted to be deflected by the movement of the member, said member comprising a differential fluid pressure measuring device having a shaft that is rotated an angular extent depending upon the magnitude of the measured differential fluid pressure, said device having at least one non-linear measuring region; strain gauge means mounted on the support means for being placed in strain upon deflection of the support means; and circuit means including the strain gauge means as an operative part thereof for providing an electric signal of value functionally related to the change in resistance of the strain gauge means resulting from the strain imposed thereon by deflection of the support means, said circuit means including selectively actuable means for modifying the electrical signal to compensate for the non-linear measurement of the device thereby causing the electric signal to linearly correspond to the actual differential fluid pressure.

2. Apparatus for converting mechanical movement of a member to a corresponding electric signal analog comprising: support means adapted to be deflected by the movement of the member; strain gauge means mounted on the support means for being placed in strain upon deflection of the support means; and circuit means including the strain gauge means as an operative part thereof for providing an electric signal of value functionally related to the change in resistance of the strain gauge means resulting from the strain imposed thereon by deflection of the support means, said circuit means having an output error due to an input error thereto, and auxiliary means for modifying the electric signal to compensate for said input error thereby causing the electric signal to correspond to an accurate input to said circuit means, said circuit means including a Wheatstone bridge, said strain gauge means including two strain gauges connected as two adjacent legs in said bridge, a load, said circuit means including an amplifier for supplying an output current to said load directly proportional to the output of said bridge, said auxiliary means being connected to supply said load with additional current.

References Cited

UNITED STATES PATENTS

| | | | |
|---|---|---|---|
| 2,590,324 | 3/1952 | Jones | 73—407 X |
| 2,901,905 | 9/1959 | Horst | 73—1 |
| 3,411,361 | 11/1968 | McLellan. | |
| 3,381,519 | 5/1968 | Ashmead et al. | 73—23.1 |
| 3,434,090 | 3/1969 | Chelner | 73—88.5 |

JERRY W. MYRACLE, Primary Examiner

U.S. Cl. X.R.

73—88.5